(12) United States Patent
Brunson

(10) Patent No.: US 8,576,996 B2
(45) Date of Patent: Nov. 5, 2013

(54) THIS CALL

(75) Inventor: Gordon R. Brunson, Broomfield, CO (US)

(73) Assignee: Avaya Inc.

( * ) Notice: Subject to any disclaimer, the term of this patent is extended or adjusted under 35 U.S.C. 154(b) by 245 days.

(21) Appl. No.: 12/966,835

(22) Filed: Dec. 13, 2010

(65) Prior Publication Data

US 2012/0148037 A1 Jun. 14, 2012

(51) Int. Cl.
*H04M 11/00* (2006.01)

(52) U.S. Cl.
USPC .................... 379/93.02; 455/416; 455/519

(58) Field of Classification Search
USPC ......... 379/93.02, 93.21; 455/416, 417, 414.1, 455/519
See application file for complete search history.

(56) References Cited

U.S. PATENT DOCUMENTS

| | | | |
|---|---|---|---|
| 6,842,460 B1 | 1/2005 | Olkkonen et al. | |
| 7,031,700 B1 | 4/2006 | Weaver et al. | |
| 2003/0003900 A1* | 1/2003 | Goss et al. | 455/417 |
| 2003/0073431 A1* | 4/2003 | Dorenbosch | 455/417 |
| 2006/0040692 A1* | 2/2006 | Anttila et al. | 455/519 |
| 2007/0071203 A1 | 3/2007 | Boyer et al. | |
| 2007/0091906 A1 | 4/2007 | Croy et al. | |
| 2008/0160976 A1 | 7/2008 | Virolainen et al. | |
| 2009/0011753 A1* | 1/2009 | Barnier | 455/422.1 |
| 2009/0143053 A1* | 6/2009 | Levien et al. | 455/417 |
| 2011/0289203 A1 | 11/2011 | Braudes et al. | |
| 2011/0289219 A1 | 11/2011 | Braudes et al. | |

FOREIGN PATENT DOCUMENTS

EP 2341689 7/2011

OTHER PUBLICATIONS

Official Action for United Kingdom Patent Application No. GB1121282.6, dated Apr. 11, 2012, 7 pages.

* cited by examiner

*Primary Examiner* — Stella Woo
(74) *Attorney, Agent, or Firm* — Sheridan Ross P.C.

(57) ABSTRACT

An in-progress call can be manipulated such that user devices in proximity to the in-progress call, but not initially part of the call, are enabled to join the in-progress call. Determining that a user device is in proximity to an in-progress call may include detection, by the user device, of an in-progress call. Alternatively, or in addition, a communication device involved in the in-progress call may detect a user device and query the user device as to whether it has permissions to join the in-progress call and, if so, whether it wants to join the in-progress call.

11 Claims, 9 Drawing Sheets

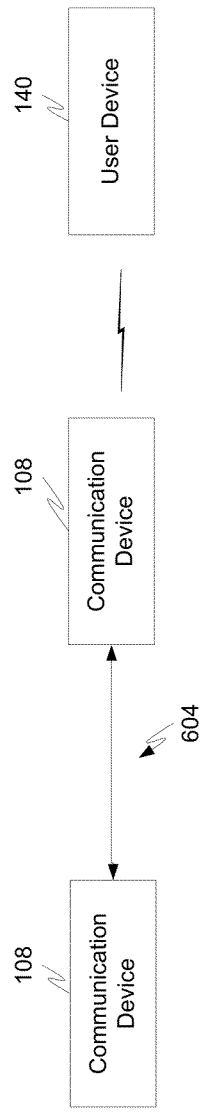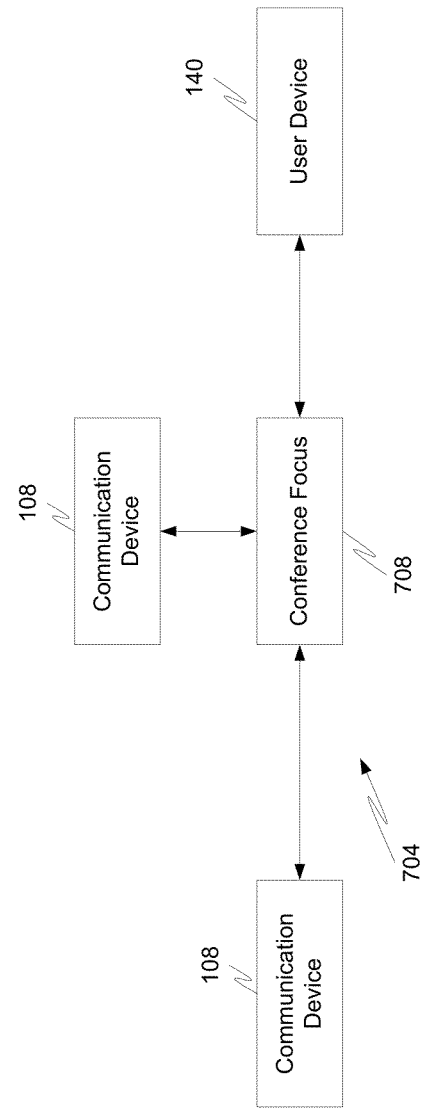

THIS CALL

FIELD OF THE DISCLOSURE

The present disclosure is generally directed toward communications and more specifically directed toward manipulating in-progress communication sessions.

BACKGROUND

Even with the advent of "smart phones", many people still carry around multiple communication devices. In particular, enterprise users often carry a personal phone, a WiFi enabled PDA, a portable personal recording device (especially in the legal field), or some other WiFi enabled mobile device (e.g., personal laptop, iPod®, iPod Touch®, iPad®, etc.). Scenarios can be imagined where a user would want to have their mobile device connect to an in-progress call. For example, a user may be accustomed to taking notes on their mobile device and desires to take notes on that device while associating the notes with an in-progress call. Other times it may be desirable to have a portable recording device connect with the in-progress call as a participant rather than requiring the user to have a phone that is capable of recording calls or requiring the user place the recorder to the speaker of the phone. Yet another motivation is to share application data such as a picture, document, or other file from the portable device onto the appropriate media stream of an existing call. This mechanism could also be used to provide access to device cameras and writing tablets. This is currently very difficult because there are many challenges to bringing in a third-party device during an in-progress call. Most solutions require device association to occur before a call begins.

SUMMARY

It is with respect to the above issues and other problems that the embodiments presented herein were contemplated. This disclosure proposes, among other things, a process of allowing a user device (may be any type of mobile or immobile computing or telecommunication device) to join an in-progress call in an ad hoc fashion.

In some embodiments, the joining process may be initiated by the user device attempting to join the in-progress call. In some embodiments, the joining process may be initiated by one or more communication devices involved in the in-progress call.

Regardless of whether a user device or currently-participating communication device initiates the joining process, the actual implementation of the joining process may be performed in a number of steps. In some embodiments, the first step of the process is an announcement/invitation step where the user device searches for existing calls (usually based on the user device detecting an in-progress call or determining that it is within proximity of a communication device currently engaged in an in-progress call). Part of the announcement/invitation step may involve sharing information between the user device and communication device whereby one or both devices obtain permissions/information about the other device. The obtained information can then be used to determine if the user device is allowed to join the in-progress call and, if so, further enable the manipulation of the in-progress call to incorporate the user device.

Embodiments of the present disclosure also envision the case where a number of participants are in a conference room and the user devices of one or more of the participants are able to attach to the communication device supporting a room-based audio/video/web teleconference system. As one example, a conference communication device may be shared by a plurality of participants in a room, and one or more of the participants may allow their user device to connect with the in-progress call by exchanging permissions/information with the conference communication device.

The manner in which this step is performed can vary significantly depending upon a number of factors including the type of user device that is joining the in-progress call, the type of media being exchanged in the call, the number of communication devices currently involved in the call, and so on. For example, there are situations where a network of trusted devices can be created and in which each trusted device is enabled to share operating parameters, thereby increasing simultaneous ease-of-use. If the user device detects that it is within proximity of such a "trusted" device, then the user device may query the trusted device as to whether or not it is involved in a call. This process can be manually driven or automated depending upon user preferences. In the case of a user device joining in a conference room setting, permission may be granted by providing credentials to the user device that provide proof of being an invitee to the meeting, or by having someone in the room provide an explicit confirmation of the join request.

Embodiments of the present disclosure also enable a user device to search for an in-progress call by doing a WiFi network-based room-number look-up for devices that do not support ad-hoc direct connection from proximity devices.

A second step of the joining process may involve the more complicated process of actually manipulating the in-progress call to allow the user device to join the in-progress call. In some embodiments, the user device utilizes information obtained during the first step and accesses the core of an enterprise network that is facilitating the call. Once the user device has accessed the core of the enterprise network, the user device is capable of hooking into the existing call, perhaps by leveraging a SIP anchor point that was previously sequenced into the call during call set-up, by transmitting one or more SIP messages (e.g., INVITE, REFER, etc.) to communication devices currently participating in the existing call, or by automatically dialing a conference number and participation code. Additional details of SIP anchor points and the ways in which the user device may join the in-progress call via the SIP anchor points are described in U.S. patent application Ser. Nos. 12/783,224 and 12/783,249, both filed on May 19, 2010, and both of which are hereby incorporated herein by reference in their entirety.

Depending upon the manner in which the user device desires to join the call, the user device may act as another communication device by connecting with a conference mixer, or the user device may hook into some other application that is already involved in the call. The exact way in which the user device becomes involved in the call will depend upon the user's needs and whether or not a logical call model was used to set-up the call. In some embodiments, the topology of the in-progress call may be modified to (1) incorporate the user device and (2) optimize the utilization of communication resources.

In some embodiments, certain calls which are considered more likely to have a user device request to join the call may be initially set up with a topology that enables a user device to quickly and efficiently join the in-progress call. Examples of such calls may be calls established between a call center agent and a customer, since these types of calls are likely to have a user device of a call center supervisor want to join the in-progress call.

In some embodiments, a method is provided that generally comprises:

determining that a user device is within proximity of an in-progress call between two or more communication devices;

receiving a request from the user device to join the in-progress call;

determining that the user device is allowed to join the in-progress call; and providing the user device with a call setup message which enables the user device to join the in-progress call.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures:

FIG. 6 is a block diagram of a communication system in a fourth configuration in accordance with embodiments of the present disclosure;

FIG. 7 is a block diagram of a communication system in a fifth configuration in accordance with embodiments of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
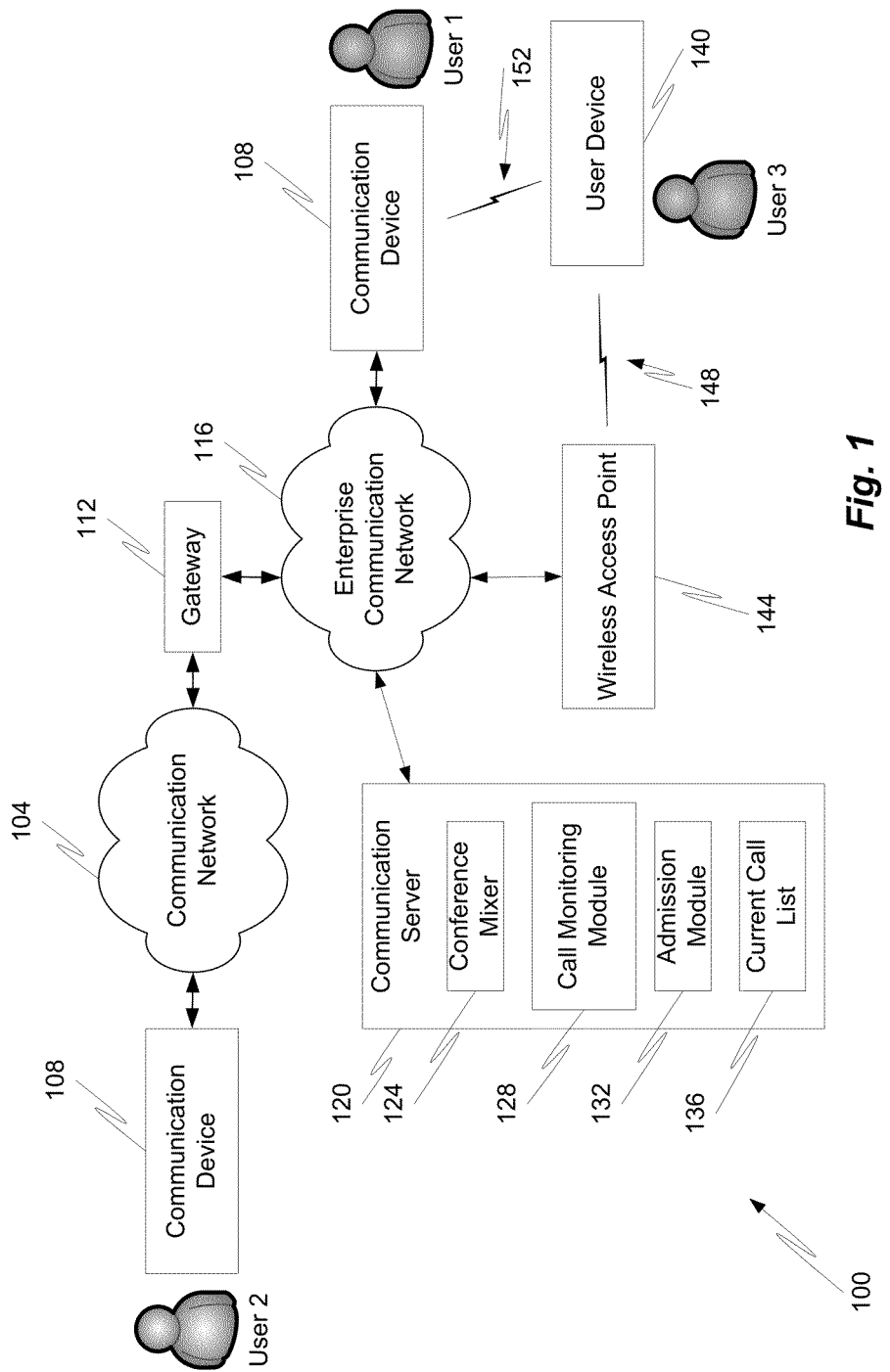
FIG. 1 is a block diagram of a communication system in a first configuration in accordance with embodiments of the present disclosure.

FIG. 1 shows an illustrative embodiment of a communication system 100 in a first configuration in accordance with at least some embodiments of the present disclosure. The communication system 100 includes one or more communication networks 104, 116, which facilitate calls between two or more communication devices 108. As used herein, the term "call" is understood to include real-time voice, video, multi-media, and/or web-based communication sessions. In some embodiments, calls may include the exchange of media packets and/or or control packets (collectively referred to as "communication packets") across one or both of the communication networks 104, 116. In some embodiments, a media stream may be established directly between communication devices 108 using known call set-up protocols, such as H.323 and SIP. In some embodiments, a call may comprise a Peer-to-Peer ("P2P") call between communication devices 108. In some embodiments, a call may comprise a conference call between two, three, four, or more communication devices 108. Conference calls may be facilitated by a conference mixer that is either located at a Private Branch eXchange (PBX), conference server, or locally on a communication device 108.

In some embodiments, an enterprise communication network 116 is separated from the communication network 104 by a gateway 112, which acts as a physical and logical barrier between the enterprise communication network 116 and the communication network 104. The gateway 112, while not necessary, is usually desirable to control security of the enterprise communication network 116.

It should also be noted that while two networks 104, 116 are depicted, embodiments of the present disclosure may be implemented with greater or fewer networks. For example, a first communication device 108 connected to a first enterprise communication network 116 may be engaged in a call with a second communication device 108 connected to a second enterprise communication network 116. The first and second enterprise communication networks 116 may be separated by the communication network 104 and two or more gateways 112. As another example, all communication devices 108 involved in a call may be connected to the same enterprise communication network 116, in which case the communication network 104 is not needed to carry communication packets between the communication devices 108.

In some embodiments, the communication network 104 may correspond to an un-trusted communication network that does not have any unitary set of rules or protocols for maintaining the safety and security of information shared across the communication network 104. The enterprise communication network 116, on the other hand, may be administered by a single enterprise or business and may, therefore, be administered with a strict set of security rules. In such a configuration, the gateway 112 may comprise functionality to (1) filter out un-trusted or unwanted communications from the communication network 104 and (2) translate communications from the communication network 104 such that the communications can be handled according to the protocols of the enterprise communication network 116.

In a very simple example, the communication network 104 may correspond to a circuit-switched communication network and the enterprise communication network 116 may correspond to a packet-switched communication network. In another very simple example, the communication network 104 and enterprise communication network 116 may both correspond to a packet-switched communication network, but may utilize different communication protocols. In a more specific example, the enterprise communication network 116 may correspond to a Session Initiation Protocol (SIP)-based or H.323-based network and the communication network 104 may correspond to the Internet.

In accordance with at least some embodiments of the present disclosure, one or both of the communication networks 104, 116 may comprise any type of known communication medium or collection of communication media and may use any type of protocols to transport messages between communication devices 108. The communication networks 104, 116 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a SIP network, a cellular network, and any other type of packet-switched or circuit-switched network known in the art.

Examples of the enterprise communication network 116 include, without limitation, a LAN, a WAN, a SIP network, an H.323 network, or combinations thereof. In addition, it can be appreciated that the communication networks 104, 116 need not be limited to any one network type, and instead may be comprised of a number of different networks and/or network types. Moreover, the communication networks 104, 116 may comprise a number of different communication media such as coaxial cable, copper cable/wire, fiber-optic cable, antennas for transmitting/receiving wireless messages, and combinations thereof.

In accordance with at least some embodiments of the present disclosure, the communication devices 108 may comprise any type of known communication equipment or collection of communication equipment. Examples of suitable communication devices 108 include, but are not limited to, a personal computer, laptop, Personal Digital Assistant (PDA), cellular phone, smart phone, digital phone, softphone, telephone, or combinations thereof. In general each communication device 108 may be adapted to support one or more of video, audio, text, and/or data communications with other communication devices 108. The type of medium or media used by the communication device 108 to communicate with other communication devices 108 may depend upon the communication applications available on the communication devices 108 and the network to which the communication device 108 is attached.

Each communication device 108 may be configured to engage in one, two, three, or more calls with one or other communication devices 108 at substantially the same time. As noted above, the calls may be established directly between the communication devices 108 or may be established via a communication server 120.

The communication server 120 may comprise, in some embodiments, a conference mixer 124 to facilitate multi-party calls, a call monitoring module 128, an admission module 132, and a current call list 136. While the communication server 120 can be used to facilitate communications between communication devices 108, it may also be utilized to manipulate in-progress calls to allow a user device 140 to join the in-progress call.

In some embodiments, the call monitoring module 128 is configured to monitor in-progress calls established over the enterprise communication network 116. In particular, the call monitoring module 128 may monitor the status of all or a subset of all calls established over the enterprise communication network 116. The call monitoring module 128 may also be used to detect when a user device 140 desires to join such an in-progress call and may further be configured to retrieve the information needed to enable the user device 140 to join the in-progress call. In some embodiments, the call monitoring module 128 is configured to generate a fingerprint (e.g., sample audio and/or image content) of an in-progress call for purposes of confirming that a user device 140 is within proximity of an in-progress call and is, therefore, permitted to join the in-progress call. Such fingerprint information may be stored in connection with the data structure of the current call list 136 and may be compared with fingerprint information received from a user device 140 by the admission module 132.

The types of user devices 140 utilized may be similar to the types of communication devices 108 described herein. For instance, a user device may correspond to a personal computer, laptop, PDA, cellular phone, smart phone, digital phone, softphone, telephone, or combinations thereof. In some embodiments, the user device 140 may be a personal recoding device, a netbook, an iPod®, an iPad®, or the like that is not capable of establishing a connection directly to the enterprise communication network 116. Rather, the user device 140 may need to establish a first communication link 148 with a wireless access point 144 to enable the user device 140 to connect with the enterprise communication network 116.

In some embodiments, when the call monitoring module 128 determines that a user device 140 wants to join an in-progress call, the call monitoring module 128 may obtain necessary information from the current call list 136. The information obtained from the current call list 136 may include information which identifies the in-progress call (e.g., by a call identifier, an identification of one or more communication devices 108 involved in the call, an identification of one or more users involved in the call, a location of one or more communication devices 108 involved in the call, etc.), information which defines communication parameters of the in-progress call (e.g., protocol used by the call, applications involved in the call, whether an anchor point was sequenced into the call, whether the call was established with a logical call model, authoritative servers or applications for the various users involved in the call, etc.), and the like.

The call monitoring module 128 may also optionally invoke the admission module 132 to determine if the user device 140 is permitted to join the in-progress call. In particular, the admission module 132 may be configured to receive credentials from the user device 140 to determine if the user device 140 has pre-provisioned permission to join the in-progress call. Alternatively, or in addition, the admission module 132 may receive confirmation from one or more users involved in the in-progress call to determine if the user device 140 is allowed to join the in-progress call. The admission module 132 may take the information (e.g., fingerprints of for the in-progress call) received from the user device 140 and/or users involved in the in-progress call and compare such information to information maintained in the current call list 136 to determine if the user device 140 is permitted to join the in-progress call.

As one non-limiting example, the admission module 132 may require the user device 140 to provide a fingerprint of an in-progress call that matches a fingerprint that has been independently determined for the same in-progress call by the call monitoring module 128. In some embodiments, the fingerprint generated by the user device 140 and call monitoring module 128 may correspond to hash value calculated with a hash-generating algorithm that utilizes voice activity as an input to the hash-generating algorithm. The voice activity used as the input may only correspond to a sample of voice activity obtained from the in-progress call. Other non-hash values may be used as the fingerprint as long as they are calculated to substantially uniquely describe the features of the in-progress call. In some embodiments, the fingerprint may be determined by using one or more of audio (obtained with a microphone), video (obtained with a camera), image (obtained with a camera), and text (obtained with a camera) data from the in-progress call.

If the admission module 132 determines that the fingerprint calculated by a user device 140 matches or substantially matches (i.e., matches within a certain degree of tolerable error such as +/−5%) the fingerprint calculated by the call monitoring module 128, then the admission module 132 may determine that the user device 140 is actually within proximity to the in-progress call. Based on this determination, the admission module 132 may be allowed to assume that the holder of the user device 140 is being allowed to participate in the in-progress call because either that same user is using the communication device 108 already involved in the call or because the user associated with the communication device 108 is permitting the user of the user device 140 to stand within proximity of the communication device 108 such that a valid fingerprint of the call could be obtained. By allowing the admission module 132 to assume that the holder of the user device 140 is permitted to be within listening or viewing proximity of the in-progress call, the admission module 132 can then determine that the user device 140 is permitted to join the in-progress call. Once this determination is made, the admission module 132 may be permitted to allow the user device 140 to join the in-progress call.

As can be seen in FIG. 1, the user device 140 may invoke the joining process by detecting that it is within proximity of an in-progress call (e.g., by detecting an exchange, or portion thereof, of communications which matches or substantially matches an exchange being monitored by the call monitoring module 128). Alternatively, the user device 140 may invoke the joining process when a holder of the user device 140 engages a user input on the user device 140 that instructs the user device 140 to begin the "join this call process."

As discussed above, the comparison of a fingerprint determined with audio data captured by the user device 140 and a fingerprint determined with audio data captured by the call monitoring module 128 does not necessarily have to result in a perfect or near-perfect match. Rather, the call admission module 132 may determine that the user device 140 is within proximity of an in-progress call may determining that audio data captured by the user device 140 matches or substantially matches audio data captured by a single communication device 108 involved in the call. For example, if the call is a two-party call, the audio data captured by the user device 140 would only need to match audio data captured for one user involved in the two-party call, since the user device 140 is probably only in proximity to one user but not the other user.

Prior to connecting with an in-progress call, the user device 140 may exchange data with the communication server 120 via the first communication link 148 established between the user device 140 and enterprise communication network 116. In some embodiments, the first communication link 148 comprises a communication link established with a wireless access point 144. In some embodiments, the first communication link 148 may correspond to a communication link established using 802.11N standards. Accordingly the wireless access point 144 may correspond to a wireless router that is compliant with one or more 802.11 standards and the user device 140 may comprise a wireless antenna and driver which enable the user device 140 to exchange communications with the wireless access point 144. Accordingly, the first communication link 148 may provide the user device 140 with a way of connecting with the core of the enterprise communication network 116 and more specifically with a way of connecting with the communication server 120.

Other mechanisms for determining that the user device 140 is within proximity to an in-progress call may not require the comparison of audio-only fingerprints. Rather, video or image comparisons may be utilized. In other embodiments, the user device 140 may utilize a second communication link 152 to determine if it is within proximity to a communication device 108.

As one example, if both the communication device 108 and user device 140 are equipped with Bluetooth communication capabilities, then the second communication link 152 may correspond to a Bluetooth link established between the user device 140 and communication device 108. Since the Bluetooth standard only have a capture range of about 10 meters, establishment of the second communication link 152 may be sufficient evidence to indicate that the user device 140 is in proximity to any calls in which the communication device 108 is involved. Moreover, establishment of the second communication link 152 may enable the admission module 132 to assume that a holder of the user device 140 is allowed to join the in-progress call because it has connected with a participating communication device 108.

As another example, excite and response protocol detection methods which employ frequencies of 125 kHz or 13.56 MHz may be used to establish the second communication link 152. Known proximity detection technologies which utilize these frequencies usually detect within a meter or less, although some technologies have ranges greater than a meter. Again, if the second communication link 152 is established, then it can be determined that the user device 140 is in proximity to the communication device 108 and any call in which the communication device 108 is involved.

In still other embodiments, actual physical contact between the communication device 108 involved in an in-progress call and the user device 140 may be required to determine that the user device 140 is within proximity to an in-progress call. Simultaneous detection of the physical contact by the communication device 108 and user device 140 may be used to determine that the user device 140 is within proximity of the communication device 108 and is, therefore, also within proximity of in-progress call in which the communication device 108 is involved.

Proximity authorization criteria analyzed by the admission module 132 may include one or more of the above-described proximity detection technologies. In accordance with at least some embodiments of the present disclosure, the admission module 132 may consider one or more of the following as part of authorization criteria to determine if a user device 140 is allowed to join an in-progress call: (1) location (as determined by establishment of the second communication link 152, as determined by analyzing and comparing location data for the user device 140 with location data for the participating communication device 108); (2) matching fingerprints (as determined by capturing samples of audio, video, image, and text exchanges during the call); (3) shared or coordinated event detection (as determined by detecting a simultaneous bump between user device 140 and communication device 108 or detecting a substantially simultaneous engagement of a button on both the user device 140 and communication device 108); (4) physical connection (as determined by detecting that the user device 140 has established a wired connection with the communication device 108); (5) chirp detection (as determined by utilizing a mechanically-generated chirp or DTMF tone that is transmitted by the participating communication device 108 and detected at the user device 140); and (6) combinations of the above.

Although each communication device 108 is depicted as being associated with a single user, a communication device 108 may be configured to enable multiple users to share the single communication device 108. Moreover, although the user device 140 is depicted as being associated with a user that is not associated with a communication device 108, it is possible to envision situations where a single user is involved in an in-progress call with their communication device 108 and desire to have their user device 140 joined to the in-progress call. Accordingly, a single user may be associated with both a communication device 108 and user device 140.

Figure 2:
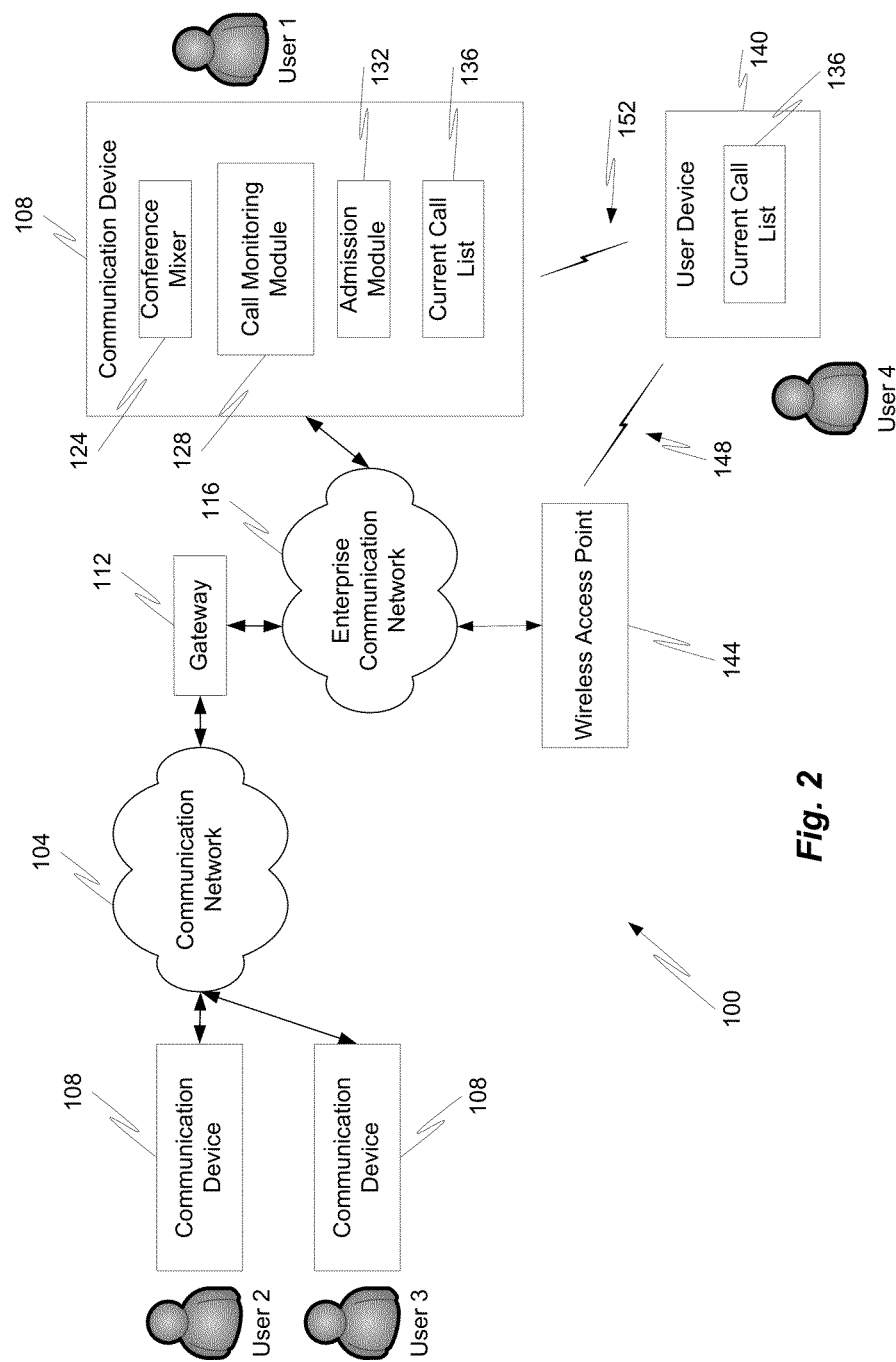
FIG. 2 is a block diagram of a communication system in a second configuration in accordance with embodiments of the present disclosure.

Referring now to FIG. 2, a second configuration of the communication system 100 will be described in accordance with at least some embodiments of the present disclosure. In this configuration, the components originally depicted as residing on the communication server 120 are implemented at the communication device 108. Equipping the communication device 108 with a conference mixer 124 enables the communication device 108 to host calls between three or more communication devices 108 locally rather than utilizing a dedicated communication server 120 to host the multi-participant conference. Similar to the conference mixer 124 on the communication server 120, the conference mixer 124 implemented on the communication device 108 may comprise any type of device or collection of devices configured to mix the media streams from the various call participants and provide the mixed signal to other participants. In some embodiments, the conference mixer 124 may also comprise the capability to remove inputs (or fail to incorporate inputs) of a particular user from a mixed signal before the mixed signal is provided back to that particular user (to ensure that the particular user does not hear him/herself on the mixed signal).

Yet another system 100 configuration can be envisioned as a hybrid between the first system 100 configuration depicted in FIG. 1 and the second system 100 configuration depicted in FIG. 2. In particular, one or more of the conference mixer 124, call monitoring module 128, admission module 132, and current call list 136 can be provided on the communication server 120 and the components not provided on the communication server 120 may be provided on one or many communication devices 108. In some embodiments, some or all communication devices 108 involved in a call may have all of the components of the communication device 108 in FIG. 2 which is associated with the first user.

Figure 3:
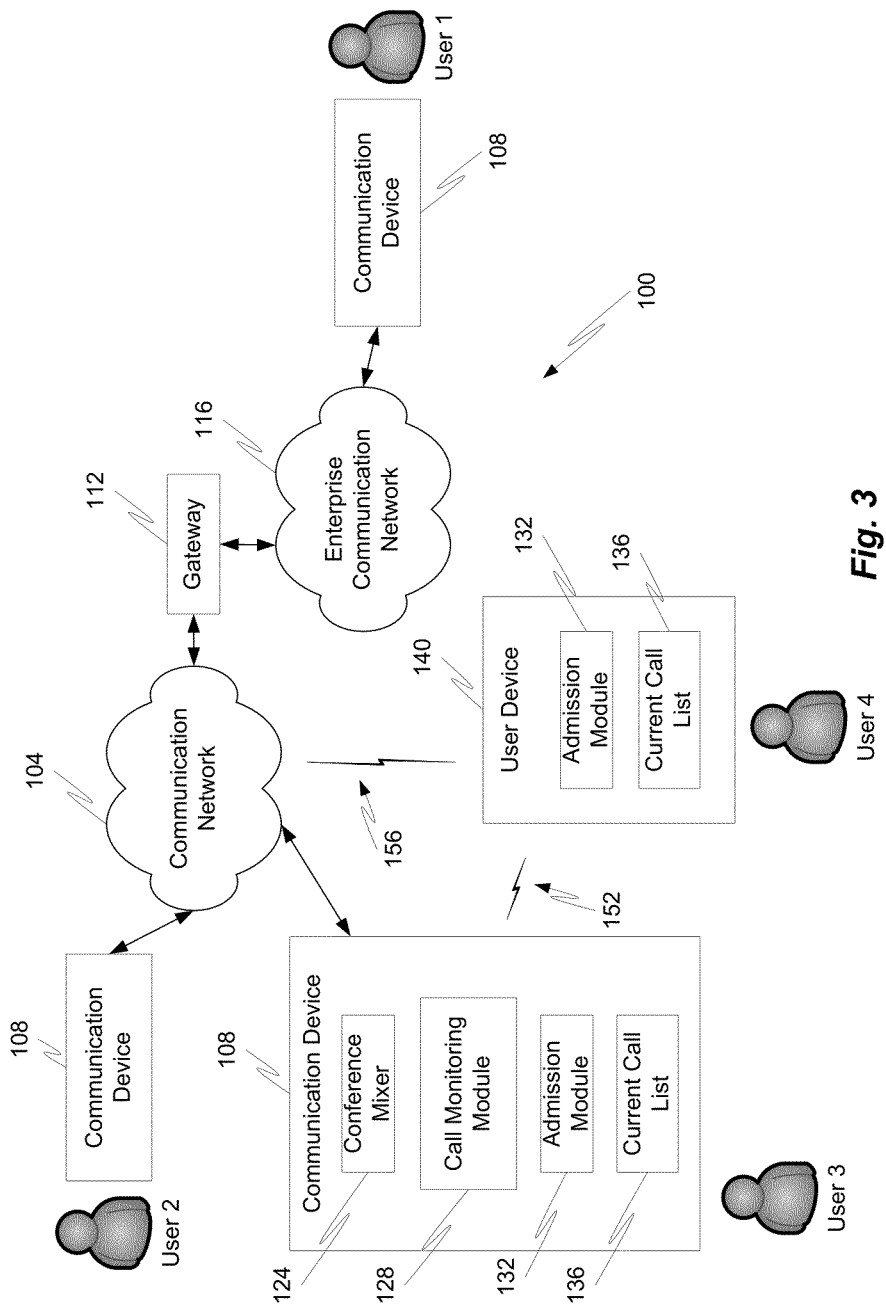
FIG. 3 is a block diagram of a communication system in a third configuration in accordance with embodiments of the present disclosure.

With reference now to FIG. 3, a third system 100 configuration will be described in accordance with at least some embodiments of the present invention. The system 100 depicted in FIG. 3 is similar to the system configurations of FIGS. 1 and/or 2 except that the user device 140 is provided with one or more components which enable the user device 140 to join an in-progress call. Another difference between the third configuration of FIG. 3 and the other system 100 configurations described herein is that the user device 140 is capable of establishing a connection directly with the communication network 104 rather than connecting to the enterprise communication network 116. In some embodiments, a third communication link 156 enables the user device 140 to connect with the communication network. In some embodiments, the third communication link 156 comprises a cellular communication link and the communication network 104 at least partially comprises some form of known cellular communication network (e.g., Global System for Mobile Communications (GSM) and variants thereof such as 2G, 3G, 4G, etc., General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN)). Alternatively, or in addition, the communication network 104 may comprise a cellular communication network and the third communication link 156 may comprise a satellite communication link. In some embodiments, the third communication link 156 may comprise an unsecured (e.g., unencrypted) WiFi connection to the communication network 104.

One advantage of the third system 100 configuration is that the user device 140 is configured to maintain its own version of a current call list 136. The version of the current call list 136 maintained by the user device 140 may be the same or different from the version of the current call list 136 maintained by the communication device 108 (or communication server 120). In some embodiments, the current call list 136 maintained on the user device 140 may comprise information related to calls which the user device 140 is allowed to join (e.g., calls to which the user associated with the user device 140 has been invited prior to the call being established). The current call list 136 maintained on the user device 140 may also comprise information for just those in-progress calls that have been detected as being within proximity of the user device 140. Accordingly, the size of the current call list 136 maintained on the user device 140 may be smaller or larger than the current call list 136 maintained on the communication device 108 (or communication server 120) depending upon the number calls with which the user device 140 is joined and depending upon the number of calls that are known to the communication device 108 (or communication server 120).

Figure 4:
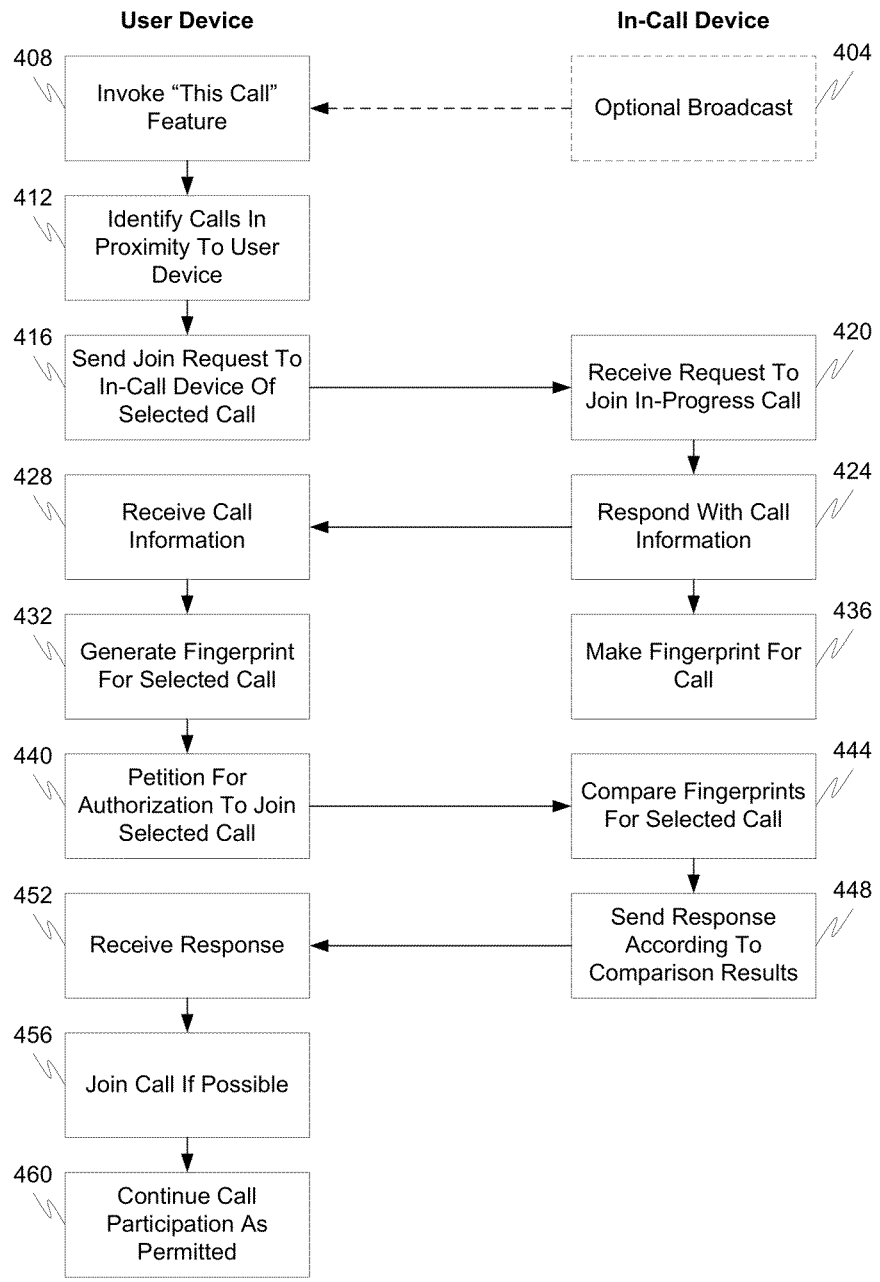
FIG. 4 is a flow diagram depicting a first call-joining process in accordance with embodiments of the present disclosure.

With reference now to FIG. 4, details of a first call-joining process will be described in accordance with at least some embodiments of the present disclosure. The process begins with an optional step in which a communication device 108 participating in a call broadcasts a message indicating that it is currently involved in a call (step 404). The message may be transmitted to any user device 140 within a predetermined proximity of the participating communication device 140 or it may be specifically directed to the user device 140 if a communication link has been established between the user device 140 and participating communication device 108.

Thereafter, or without receiving any information from the participating communication device 108, the user device 140 may be instructed to begin a process of joining a call that is within proximity of the user device (step 408). This step may be initiated upon receiving the optional broadcast from the participating communication device 108. This may occur automatically or upon receiving confirmation from a holder of the user device 140 that initiating such a process is acceptable. Alternatively, or in addition, this step may be initiated when a holder of the user device 140 presses a "this call" button on the user device 140. Advantageously, invoking the "this call" feature allows the holder of the user device 140 to join the in-progress call without actually knowing any numbers of the participating communication devices 108 or conference numbers supporting the in-progress call. Rather, the user device 140 only has to be within proximity of the in-progress call and prove the same to the admission module 132 associated with the call. Upon proving the fact that it is within proximity to the in-progress call, the user device 140 can be provided with the information needed to join the in-progress call.

Thus, the process continues with the user device 140 identifying one or more calls that are within proximity of the user device 140 (i.e., within a range which allows the user device 140 to capture audio, video, image, and/or text data of the in-progress call) (step 412). This step may be facilitated with information received during the optional broadcast step. Alternatively, it may not be necessary for the user device 140 to specifically identify an in-progress call. Rather, the user device 140 may only need to determine that it is within proximity of one or more calls. This may be assumed based on the fact that the "this call" button has been pressed by the holder of the user device 140.

Accordingly, after the "this call" feature has been invoked at the user device 140, the method continues with the user device 140 generating and transmitting a join request to one or more communication devices 108 currently involved in the call and/or a device containing the admission module 132 (step 416). This step may involve transmitting the request to the communication device 108 that transmitted the broadcast in step 404. Alternatively, or in addition, if the user device 140 has established a communication link 152 with a communication device 108, then the request may be transmitted across the communication link. Alternatively, or in addition, this step may require the user device 140 to broadcast its request such that any communication device 108 within its broadcast range receives the request. Alternatively, or in addition, if the communication link 148 has been established with a wireless access point 144, then the request may be transmitted via the wireless access point 144 to a communication server 120 having the admission module 132.

The request is then received at one or more devices involved in the call (e.g., communication server 120, communication device 108, etc.) (step 420). Upon receiving the request, the device currently involved in the call determines call information for the in-progress call(s) that are determined to be within proximity of the user device 140. These calls may correspond to any calls that might possibly be within proximity of the user device 140 or it may correspond to a call specifically identified by the user device in the request. The current call list 136 is referenced to obtain the desired information for the call and at least some call information is provided back to the user device 140 (step 424).

The types of call information that may be provided to the user device 140 include, without limitation, call identification information, information which identifies one or more communication devices 108 currently involved in the in-progress call, information which identified users involved in the in-progress call, identification information for communication servers 120 which are authoritative for either users or communication devices 108 currently involved in the in-progress call, communication protocol(s) being used to conduct the in-progress call, parameters of the in-progress call (e.g., elapsed time, media type(s) used by the in-progress call, routes over which media and control packets are traversing, etc.). Along with the call information, the device currently participating in the call may also provide the user device 140 with a request to prove that it, the user device 140, is within proximity to a particular call.

The response of step 424 may also operate as a synchronizing event which causes the call monitoring module 128 to begin generating a fingerprint for the call which the user device 140 is attempting to join (step 436). The fingerprint may be calculated with one or more of audio, video, image, and text data as an input to a specific type of fingerprint-generating algorithm. Alternatively, or in addition, the response of step 424 may trigger the participating device to generate and transmit a DTMF tone or beep into the call which the user device 140 is attempting to join.

Upon receiving the response at the user device 140 (step 428), the user device 140 may capture at least a sample of the call and generate its own version of a fingerprint (step 432). As can be appreciated, the user device 140 may have begun capturing data from the call before step 416 and may generate a fingerprint based on such data. If a DTMF tone or beep was inserted into the call after step 420, the user device 140 should have captured a sample of the call that included the DTMF tone or beep.

After the user device 140 has captured the appropriate data from the call in proximity of the user device 140, the user device 140 generates the fingerprint and provides the fingerprint back to the device currently involved in the call along with a petition to join the selected call (step 440). The fingerprint received from the user device 140 may then be provided to the appropriate admission module 132 where it is compared with a fingerprint generated by the call monitoring module 128 (step 444). Although FIG. 4 depicts exchanging and comparing fingerprints to prove that the user device 140 is within proximity (i.e., hearing and/or sight distance) of the in-progress call, one or more alternative methods of verifying user device-to-call proximity may be utilized such as determining and comparing locations of the user device 140 and one or more communication devices 108 involved in the call, determining a simultaneous event has been detected at the user device and one or more communication devices 108 involved in the call, and so on.

Depending upon the results of the comparison, the admission module 132 will make a determination as to whether or not the user device 140 is entitled to join the call. As one example, if the compared fingerprints match or match within a certain degree of error tolerance, then the user device 140 may be permitted to join the call. If the fingerprints do not match, then the user device 140 may either not be permitted to join the call or the user device 140 may need to re-prove its proximity to the in-progress call. The admission module 132 then generates and sends a response to the petitioning user device 140 in accordance with the results obtained from step 444 (step 448).

If the admission module 132 confirms that the user device 140 is allowed to join the in-progress call, then the admission module 132 may include call-connection information in the response sent to the user device 140. More specifically, the user device 140, if permitted to join the call, may be provided with one or more of SIP dialog information which describes the in-progress call and provides the user device 140 with the necessary information to join the in-progress call. Alternatively, or in addition, the user device 140 may be provided with conference parameters (e.g., confrence mixer identifiers, dial-in numbers and/or passcodes) enabling the user device 140 to join the conference. If the admission module 132 determines that the user device 140 is not allowed to join the in-progress call, then a NACK message, NULL, or no message may be provided back to the user device 140.

Assuming that the user device 140 receives some sort of response from the admission module 132 (step 452), the user device 140 will attempt to join the in-progress call by utilizing the information received in the response (step 456). If either a negative response or no response is received, then the method will end or the user device 140 may re-petition to join the previously selected or a different call.

In some embodiments, if the response received at the user device 140 includes information enabling the user device 140 to join the call, then the user device will transmit one or more call-joining messages to a device currently involved in the call. In some embodiments, the user device 140 may attempt to join the call by transmitting a call-joining message to the device which transmitted the response in step 448. Alternatively, the user device 140 may attempt to join the call by transmitting a call-joining message to some other device currently involved in the call. More specifically, if the user device 140 received SIP dialog information, then the user device 140 may generate and transmit an INVITE message to a communication device 108 or communication server 120 involved in the call. However, if the user device 140 received conference parameters, then the user device 140 may automatically dial a conference number and/or passcode as required.

The user device 140 may then be permitted to continue call participation for as long as is permitted (step 460). In some embodiments, after the in-progress call has been altered to allow the user device 140 to join, it may be determined whether or not the user device 140 is still within proximity of the in-progress call. If so, the status quo is maintained. If not, it may be necessary to determine if the user device 140 that has left proximity of the in-progress call is allowed to continue its involvement with the call. As a default, this query may be answered affirmatively.

In some embodiments the user device 140 that joined the call at step 456 does not have to be the same user device 140 that is dropped from the call. In particular, a first user device 140 may have been originally included in the call when the call was established whereas a second user device 140 may have joined the call at some point after the call was established. Thus, the second user device 140 may be considered the user device that joined the call in step 456. If sometime later the first user device 140 leaves the proximity of the in-progress call (e.g., leaves an audible range of the call or its participants, moves greater than a predetermined distance away from a communication device 108 involved in the in-progress call, etc.), then the first user device 140 may be the user device that is dropped from the call even though the first user device 140 was originally included in the call.

Figure 5:
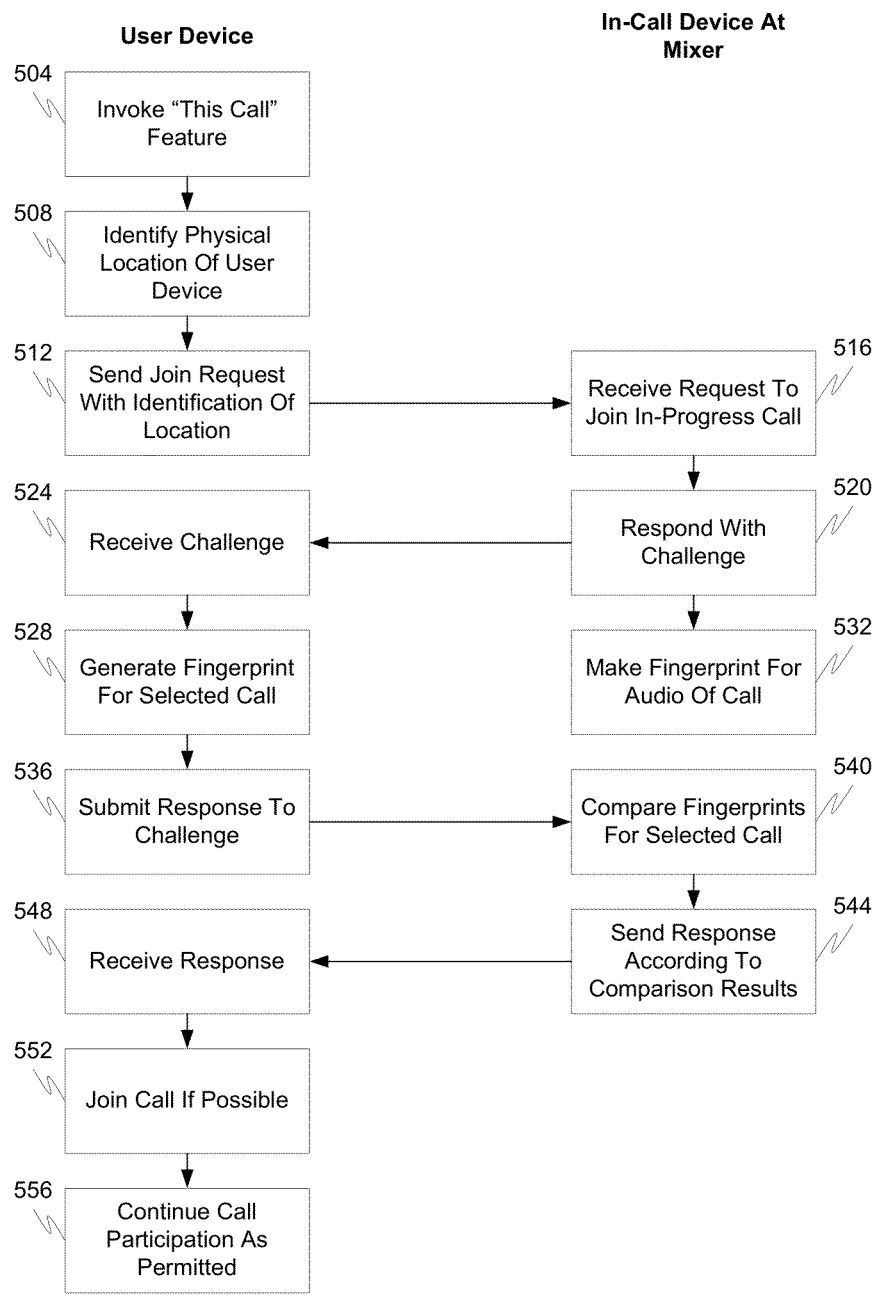
FIG. 5 is a flow diagram depicting a second call-joining process in accordance with embodiments of the present disclosure.

With reference now to FIG. 5, details of a second call-joining process will be described in accordance with at least some embodiments of the present disclosure. The process begins when a holder invokes the "this call" feature on a user device 140 (step 504). Once the feature has been invoked, the user device 140 will begin the process of identifying its own location information (step 508). In some embodiments, this location information may be determined from GPS data, cellular triangulation techniques, WiFi location techniques, or the like. In some embodiments, a holder of the user device 140 may input the location of the user device 140 (i.e., identify room number, building number, etc.).

The user device 140 then generates and sends a request to a conference mixer 124 currently involved in the call (step 512). The request, in some embodiments, may contain the location information determined in step 508.

The conference mixer 124, or the device containing the conference mixer 124 (i.e., communication server 120 or communication device 108), receives the request from the user device 140 (step 516) and then responds by issuing a challenge to the user device 140 (step 520). The challenge may include instructions for the user device 140 to prove that it is actually in the location asserted by the user device 140. Like step 424 described above, step 520 may operate as a synchronizing event between the user device 140 and the admission module 132 wanting to prove that the user device 140 is within proximity of a particular call. Thus, after the challenge has been issued, the admission module 132 may instruct the call monitoring module 128 to generate a fingerprint for the call which the user device 140 is attempting to join (step 532). Likewise, the user device 140 may receive the challenge (step 524) and in response thereto collect some amount of data from the in-progress call such that it can also generate a fingerprint for the call (step 528). Again, close proximity-proving techniques other than fingerprints may be utilized in accordance with at least some embodiments of the present disclosure.

After the user device 140 has generated the fingerprint for the call, it generates a response to the challenge and transmits it back to the device which issued the challenge (step 536). Upon receiving the response to the challenge, the admission module 132 may be invoked to compare the fingerprint generated by the user device 140 with the fingerprint generated by the admission module 132 (step 540). A response is generated based on the results of the comparison and sent back to the user device 140 as an ACK message, NACK message, or by failing to respond (step 544). If an ACK message is transmitted, then one or both of SIP dialog information and/or conference parameters may be provided within the ACK message (e.g., in a header, body, or trailer of the message).

When the user device 140 receives the response (step 548), the user device 140 may utilize the information contained in the response and, if possible, join the call being hosted on the conference mixer 124 as another participant (step 552). The user device 140 may continue its call participation for as long as is permitted or as long as the call lasts (step 556).

Figure 8:
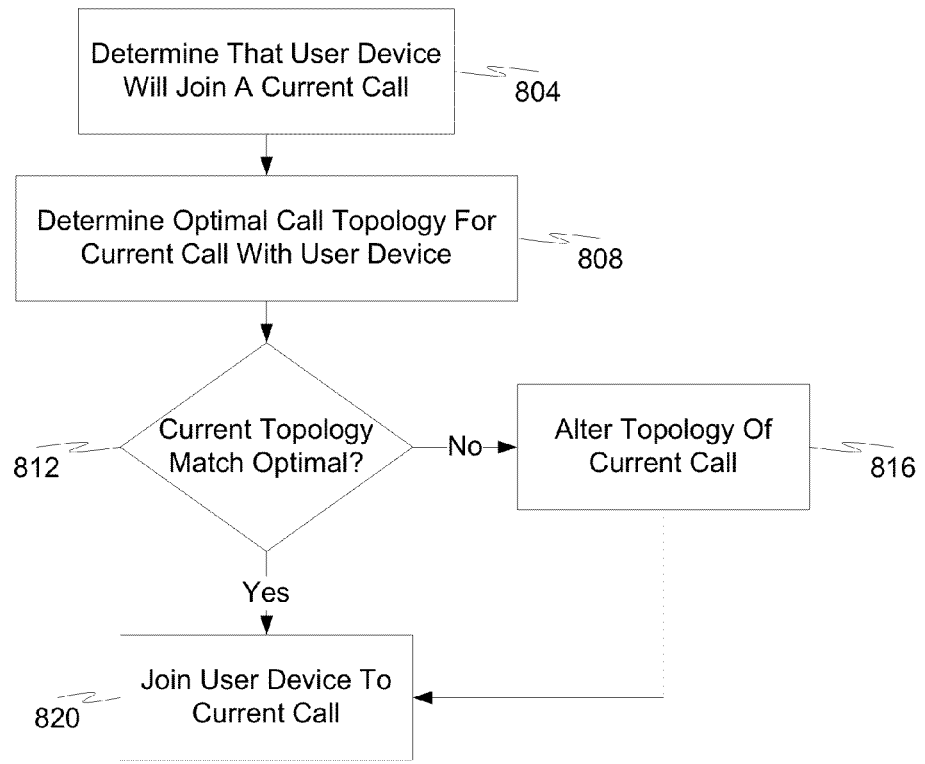
FIG. 8 is a flow diagram depicting a call-topology-alteration process in accordance with embodiments of the present disclosure.

With reference now to FIGS. 6-8, different system 100 configurations, particularly call topologies, and methods for switching between the different configurations will be discussed in accordance with at least some embodiments of the present disclosure. As can be seen in FIG. 6, on type of call topology that may be maintained during an in-progress call is a P2P call topology, where a direct communication link 604 is established between two communication devices 108 involved in a call. In some embodiments, when a user device 140 joins this type of call, the communication device 108 within proximity of the user device 140 may act as a proxy for the user device 140, meaning that the communication device 108 within proximity of the user device 140 may forward media received from the other communication device 108 to the user device 140 and vice versa.

However, in some embodiments, the call topology of FIG. 6 may be altered to a conference-type topology 704 when the user device 140 joins the in-progress call between the communication devices 108. FIG. 7 illustrates one example of a conference-type topology 704 whereby two or more of the devices involved in the in-progress call exchange media via a conference focus 708. In some embodiments, the conference focus 708 may correspond to the conference mixer 124. As can be appreciated, the call topology of an in-progress call may be converted to the conference-type topology 704 to the P2P call topology or some other type of known call topology to accommodate the number of devices involved in the in-progress call as the participation in the in-progress call fluctuates.

Referring now to FIG. 8, an exemplary method of altering a call topology will be described in accordance with at least some embodiments of the present invention. Initially, it is determined that a user device 140 will join an in-progress call (step 804). This determination may be made by one or more communication devices 108 involved in the in-progress call, a communication server 120, or any other device which can exert some control over the in-progress call.

Thereafter, the call monitoring module 128 determines an optimal call topology based on one or more of (i) the current call topology; (ii) the current number of devices involved in the in-progress call; (iii) the number of devices which will be involved in the in-progress call after the user device 140 joins the in-progress call; (iv) processing/memory/conference capabilities of the devices involved in the in-progress call; (v) processing/memory/conference capabilities of the user device 140; and (vi) other processing/memory/conference capabilities available to support the in-progress call that are not currently being utilized (e.g., conference mixer 124 on a communication server 120) (step 808).

The call monitoring module 128 then compares the determined optimal call topology to the current call topology to determine if the current call topology matches the optimal call topology (step 812). If so, the user device 140 is joined to the in-progress call without altering the call topology (step 820). If not, the topology of the in-progress call is altered (step 816) before the user device 140 is joined to the in-progress call (step 820).

As can be appreciated, certain steps may be taken to pre-optimize a call topology in anticipation of adding a user device 140 to the call after the call is established. For example, if embodiments of the present invention are deployed in a contact center setting where multiple agents have multiple calls with multiple customers on a daily basis and a supervisor of the contact center desires to seamlessly join an in-progress call for some reason (e.g., training purposes, agent monitoring purposes, to provide a conference assistance to the agent, etc.), then the call topology between the customer and agent may be initially set up as a conference-type topology 704 where a conference focus 708 is used. Utilization of this particular type of call topology would enable a supervisor to join and leave in-progress calls with relative ease, thereby enhancing the supervisor's ability to manage the contact center operations.

Figure 9A:
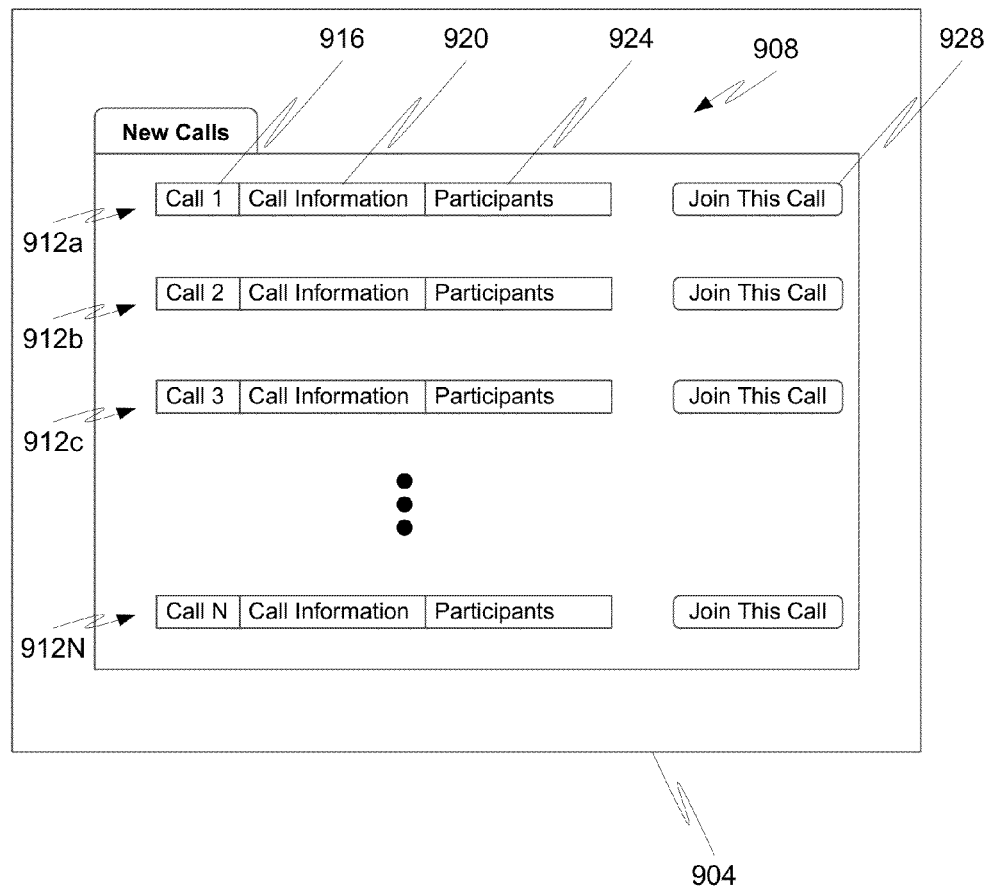
FIG. 9A is a block diagram of a first possible user interface in accordance with embodiments of the present disclosure.
Figure 9B:
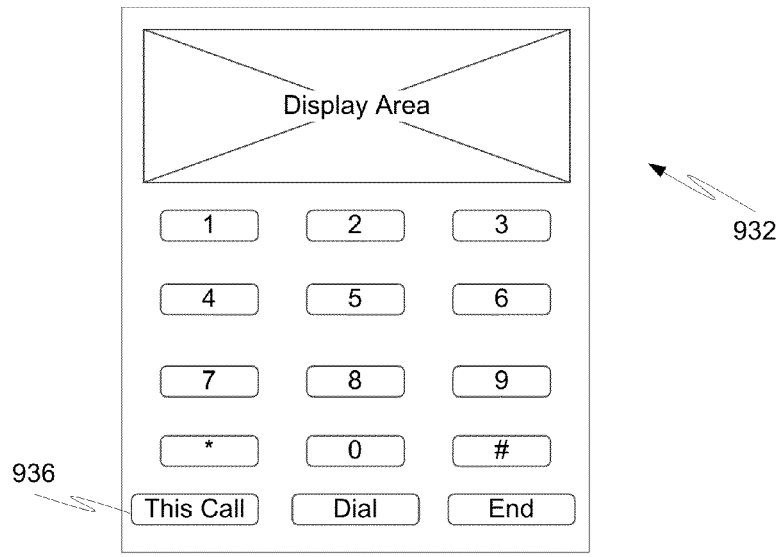
FIG. 9B is a block diagram of a second possible user interface in accordance with embodiments of the present disclosure.
Figure 9C:
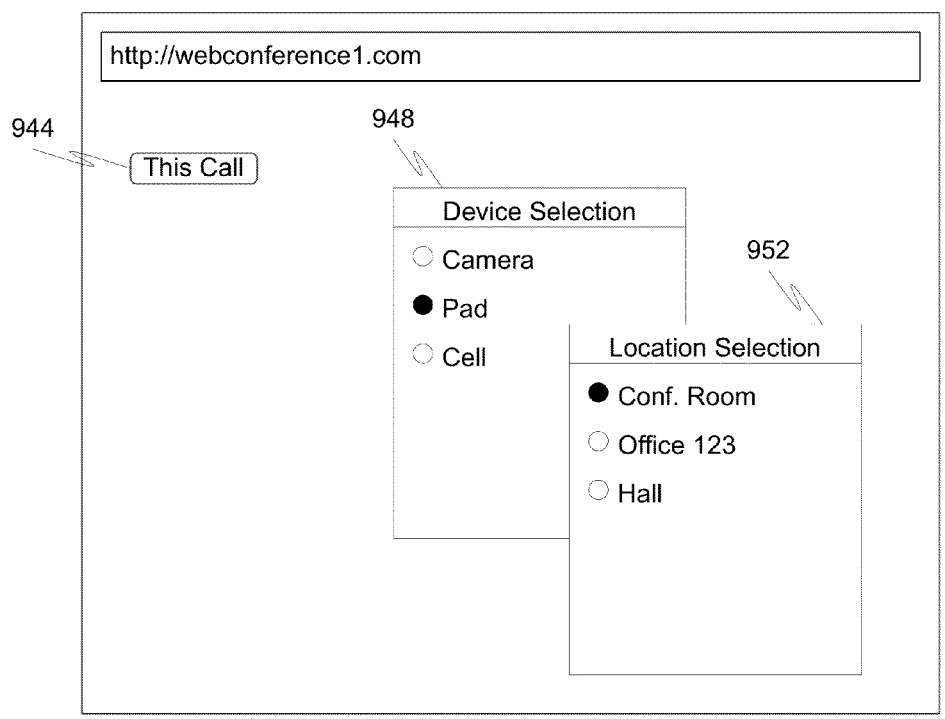
FIG. 9C is a block diagram of a third possible user interface in accordance with embodiments of the present disclosure.

With reference now to FIGS. 9A-C, details of exemplary user interfaces will be described in accordance with at least some embodiments of the present disclosure. Referring initially to FIG. 9A, a user interface display 904 on a user device 140 will be described in accordance with at least some embodiments of the present disclosure. The user interface 904 may comprise a "new calls" tab 908 which provides a listing of the various in-progress calls which are within proximity of the user device 140. For ease of discussion, such in-progress calls will be referred to as "local calls."

In some embodiments, each local call has its own display data 912a-N. The display data 912 for any particular local call may include a number of data fields helping to describe the local call to the user, thereby enabling the user to more efficiently and accurately request to join a particular in-progress call. Exemplary data fields which may be included in the display data 912 include, without limitation, a call identifier field 916, a call information field 920, and a participant identification field 924. The call identifier field 916 may display information which uniquely identifies the local call or some attribute thereof. The call information field 920 may display some or all call information related to a local call as such information is received at the user device 140. Accordingly, since the amount of call information made available to the user device 140 may vary as a function of time (e.g., more information is provided after the user device 140 has been authenticated than was provided before), the data displayed in the call information field 920 may also dynamically change. The participant identification field 924 may display information which identifies one or more participants involved in the local call, assuming that such information is made available to the user device 140 and is not sensitive or confidential.

In addition to the display data 912, each local call may also be provided with a "join this call" input 928 which, if selected by a user of the user device 140 will cause the user device to begin a call-join process as described herein. The "join this call" input 928 may be provided as a soft-key, hard-key, audible input, or any other input mechanism.

Referring now to FIG. 9B, a user interface 932 for a user device 140 will be described in accordance with at least some embodiments of the present disclosure. The user interface 932 may be a touch-screen implemented on a user device in which case the inputs depicted are soft keys. Alternatively, the user interface 932 may comprise a dedicated display area with hard buttons provided thereon in a traditional telephone keypad layout. Regardless of whether or not the user inputs are provided in hard key form or softkey form, the user interface 932 may be equipped with a "this call" button 936. Engagement or activation of the "this call" button 936 may cause the user device 140 to invoke the "join this call" feature described herein. The advantages associated with utilizing the "this call" button 936 is that the holder of the user device 140 does not have to know a number to dial if the holder desires to join an in-progress call. Rather, the "this call" button 936 enables the holder to simply press a button and connect with an in-progress call. It is also advantageous for joining conference calls which traditionally require a large number of inputs in the form of dialing a conference bridge number and then providing a participation code, passcode, or the like. Utilization of the "this call" button 936 alleviates the need to remember all of the numbers required to join a conference call. The only requirement is that the user device 140 has to be verified by the admission module 132 as described herein.

Referring now to FIG. 9C, yet another user interface 940 will be described in accordance with embodiments of the present disclosure. The user interface 940 may correspond to a web-browsing interface that is being presented via a display screen or touch pad of the user device 140. In some embodiments, a holder of the user device 140 may utilize a web-browser in an attempt to join a webconference. Certain video and/or audio conferences may also be made available via a webserver in which case a web-browser may be a suitable mechanism for joining an in-progress call.

As can be seen in FIG. 9C, the user interface 940 may include a "this call" button 944 that is presented as a hyperlink in one or more webpages provided by the webserver. If a user activates the "this call" button 944, then a first pop-up window 948 may be displayed, which requires the user to input a device type for the user device 140. The first pop-up winder 948 may then be overlapped by a second pop-up window 952, which presents a location selection menu. The contents of the first and second pop-up windows 952 may vary depending upon a location of the in-progress call, the number of participants involved in the call, and so on. Moreover, the order in which the pop-up winders are presented may be reversed without departing from the scope of the present disclosure. One purpose of utilizing pop-up windows 952 is to minimize the potential calls which the user device 140 can join at any given time. This enhances security and minimizes unnecessary bandwidth utilization.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    determining a proximity determining that a user device is within proximity of an in-progress call between two or more communication devices, further comprising, determining the user device is able to connect to the in-progress call and determining a secondary proximity of the user device to at least one communication device;
    receiving a request from the user device to join the in-progress call;
    determining that the user device is allowed to join the in-progress call; and
    providing the user device with a message which enables the user device to join the in-progress call; and
    wherein determining an acceptable secondary proximity of the user device to the at least one communication device comprises detecting a substantially simultaneous bump between the user device and the at least one communication device.

2. The method of claim 1, wherein the message comprises a call setup information that includes a SIP dialog information.

3. A method, comprising:
    determining that a user device is within proximity of an in-progress call between two or more communication devices;
    receiving a request from the user device to join the in-progress call;
    determining that the user device is allowed to join the in-progress call;
    providing the user device with a message which enables the user device to join the in-progress call;

receiving audio input at a microphone of the user device;

providing the received audio input or a fingerprint generated therewith to an admission module;

comparing, by the admission module, the received audio input or the fingerprint with media exchanges or fingerprints captured by a call monitoring module; and determining that the received audio input or fingerprint matches at least a portion of a selected media exchange or fingerprint captured by the call monitoring module.

4. The method of claim 3, wherein the received audio input comprises audio input of only a first participant involved in the in-progress call.

5. The method of claim 3, further comprising:

authenticating the user device prior to receiving the request from the user device; and in response to authenticating the user device, providing the user device with call information which describes the in-progress call to the user device.

6. The method of claim 5, wherein the call information provided to the user device comprises one or more of call identification information, information which identifies the two or more communication devices currently involved in the in-progress call, information which identified users involved in the in-progress call, identification information for communication servers which are authoritative for either users or communication devices currently involved in the in-progress call, and communication protocols being used to conduct the in-progress call.

7. The method of claim 3, further comprising:

altering the in-progress call to include the user device.

8. The method of claim 7, wherein altering the in-progress call comprises altering a topology of the in-progress call.

9. The method of claim 8, wherein the topology of the in-progress call is altered from a P2P topology to a conference-type topology.

10. A method, comprising:

determining a proximity determining that a user device is within proximity of an in-progress call between two or more communication devices, further comprising, determining the user device is able to connect to the in-progress call and determining a secondary proximity of the user device to at least one communication device;

receiving a request from the user device to join the in-progress call;

determining that the user device is allowed to join the in-progress call;

providing the user device with a message which enables the user device to join the in-progress call; and wherein determining an acceptable secondary proximity of the user device to the at least one communication device comprises detecting a substantially simultaneous user action upon each of the user device and the at least one communication device.

11. A method, comprising:

determining a proximity determining that a user device is within proximity of an in-progress call between two or more communication devices, further comprising, determining the user device is able to connect to the in-progress call and determining a secondary proximity of the user device to at least one communication device;

receiving a request from the user device to join the in-progress call;

determining that the user device is allowed to join the in-progress call;

providing the user device with a message which enables the user device to join the in-progress call; and wherein determining an acceptable secondary proximity of the user device to the at least one communication device comprises generating a tone on one of the user device and the at least one communication device and detecting the tone on the other of the user device and the at least one communication device.

* * * * *

UNITED STATES PATENT AND TRADEMARK OFFICE
CERTIFICATE OF CORRECTION

PATENT NO. : 8,576,996 B2  
APPLICATION NO. : 12/966835  
DATED : November 5, 2013  
INVENTOR(S) : Gordon R. Brunson Page 1 of 1

It is certified that error appears in the above-identified patent and that said Letters Patent is hereby corrected as shown below:

In the Claims:
Col. 18, Line 38, Claim 1:
   Delete the first 3 words "determining a proximity" from the claim body.

Signed and Sealed this
Seventh Day of January, 2014

Margaret A. Focarino
*Commissioner for Patents of the United States Patent and Trademark Office*